(12) United States Patent  (10) Patent No.: US 7,982,630 B2
Kim  (45) Date of Patent: Jul. 19, 2011

(54) DIGITAL UNITED INFORMATION INSTRUMENT PANEL FOR VEHICLE

(75) Inventor: Ju Hyun Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 413 days.

(21) Appl. No.: 12/220,851

(22) Filed: Jul. 29, 2008

(65) Prior Publication Data

US 2009/0267753 A1   Oct. 29, 2009

(30) Foreign Application Priority Data

Apr. 29, 2008 (KR) .................. 10-2008-0039879

(51) Int. Cl.
*G08B 5/00* (2006.01)
*G08B 5/36* (2006.01)
*G09F 13/12* (2006.01)
*G01P 5/00* (2006.01)

(52) U.S. Cl. ............... 340/815.4; 340/815.55; 116/62.1

(58) Field of Classification Search ............... 340/814.4, 340/814.44, 815.47, 815.53, 815.54, 815.55; 116/62.1–62.4; 74/12
See application file for complete search history.

(56) References Cited

U.S. PATENT DOCUMENTS

| | | | |
|---|---|---|---|
| 5,949,346 A * | 9/1999 | Suzuki et al. | 340/815.45 |
| 6,333,697 B1 * | 12/2001 | Kumazawa et al. | 340/815.4 |
| 6,382,127 B2 * | 5/2002 | Wehner | 116/284 |
| 6,603,393 B2 * | 8/2003 | Sumada et al. | 340/425.5 |
| 6,674,497 B2 * | 1/2004 | Brandt | 349/74 |
| 6,714,126 B2 * | 3/2004 | Wada | 340/438 |
| 6,728,605 B2 * | 4/2004 | Lash et al. | 701/1 |
| 7,236,089 B2 * | 6/2007 | Ono et al. | 340/461 |
| 7,382,274 B1 * | 6/2008 | Kermani et al. | 340/901 |
| 2002/0047819 A1 * | 4/2002 | Suehiro et al. | 345/87 |
| 2003/0142057 A1 * | 7/2003 | Niiyama et al. | 345/97 |
| 2004/0046713 A1 | 3/2004 | Tanaka et al. | |
| 2004/0105053 A1 * | 6/2004 | Ozeki et al. | 349/112 |
| 2007/0040662 A1 | 2/2007 | Harada et al. | |
| 2008/0141927 A1 * | 6/2008 | Takeshige et al. | 116/62.4 |

FOREIGN PATENT DOCUMENTS

| | | |
|---|---|---|
| JP | 05-204320 A | 8/1993 |
| JP | 2003-227737 A | 8/2003 |
| JP | 2008-051538 A | 3/2008 |

* cited by examiner

*Primary Examiner* — Jennifer Mehmood
(74) *Attorney, Agent, or Firm* — Edwards Angell Palmer & Dodge LLP; Peter F. Corless

(57) ABSTRACT

The present invention relates to a digital united information instrument panel for vehicle. The digital united information instrument panel for vehicle of the present invention includes a graduation unit indicating a velocity information of vehicle; and an united information display window indicating a driving status information of vehicle with a number and a character, while the united information display window forms a segment and a dot matrix together in a single panel and forms a black mask in the surrounding area of the segment and the dot matrix to concentrate an illumination on the segment and the dot matrix.

11 Claims, 16 Drawing Sheets

DIGITAL UNITED INFORMATION INSTRUMENT PANEL FOR VEHICLE

CROSS-REFERENCE TO RELATED APPLICATION

This application claims under 35 U.S.C. §119(a) the benefit of Korean Patent Application No. 10-2008-39879 filed Apr. 29, 2008, the entire contents of which are incorporated herein by reference.

BACKGROUND OF THE INVENTION

The present invention relates to a digital united information instrument panel for a vehicle, and more particularly, to a digital united information instrument panel for a vehicle that is capable of increasing contrast ratio by minimizing the light leakage with a black matrix to improve the visibility and the readability while applying the segment and the dot matrix together in one panel with the negative type.

Generally, the vehicle instrument panel, which is also referred to as a cluster gauge, is an instrument panel which informs a driver of the overall driving status of vehicle. While looking forward, the driver frequently looks at the vehicle instrument panel and determines the driving status.

A vehicle instrument panel can include, but is not limited to a tachometer, a speed-meter, and a thermometer/fuel-indicator, and can indicate information including the engine rotation speed (RPM) of the vehicle which is sensed through a detection sensor, the driving speed, the coolant temperature, and the fuel content condition, by the movement of a needle. Thus, the driver can determine the velocity of the vehicle by reading the number that a corresponding needle indicates. Accordingly, the driver controls the driving status while driving with reference to the information which is obtained through the instrument panel.

Exemplary vehicle instrument panels are shown in FIGS. 1a to 1c.

FIG. 1a shows an exemplary vehicle instrument panel of the segment only type 10, which has a limit in expressing certain information due to the limit of the expression function of the segments.

FIG. 1b shows an exemplary vehicle instrument panel which applies the segment and the dot matrix together in one panel. The vehicle instrument panel as the one shown in FIG. 1b exemplifies the positive type that makes a text part 20 dark and radiates the surroundings 30, so that the text part 20 is seen as a black. In such a configuration, the design is crude and the day/night visibility and the readability are lowered.

Accordingly, a vehicle instrument panel of the negative type was developed wherein the surrounding area of the text part is dark, and the illumination is concentrated on the text part.

However, in such a configuration, the light leakage of the dot matrix is larger in comparison with the segment, so that a color difference is generated between the segment and the dot matrix. Accordingly, in manufacturing the vehicle instrument panel by integrating the segment and the dot matrix into one panel, the color difference is prominent, and the visibility is lowered. Therefore, the vehicle instrument panel was manufactured as an individual type in which the segment and the dot matrix are separated. FIG. 1c exemplifies a vehicle instrument panel of this configuration. In such a vehicle instrument panel of the individual negative type as shown in exemplary FIG. 1c, the segment 10 and a dot matrix 40 are separated. As a result, the design is awkward and stiff, and it is difficult for a driver to clearly recognize the exact information displayed.

The above information disclosed in this the Background section is only for enhancement of understanding of the background of the invention and therefore it may contain information that does not form the prior art that is already known in this country to a person of ordinary skill in the art.

SUMMARY OF THE INVENTION

In one aspect, the present invention provides a digital united information instrument panel for a vehicle capable of improving the visibility and the readability by minimizing the light leakage with a black matrix while applying the segment and the dot matrix together in one panel with the negative type.

Accordingly, the invention provides a digital united information instrument panel for a vehicle including a speedmeter which includes a graduation unit indicating a velocity information of the vehicle; and an united information display window indicating the driving status information of the vehicle with a number and a character, wherein the united information display window forms a segment and a dot matrix together in a single panel and forms a black mask in the surrounding area of the segment and the dot matrix to concentrate an illumination on the segment and the dot matrix.

In one embodiment, the united information display window suitably includes a segment display unit which digitally indicates the velocity information of a vehicle by using the segment; and a dot matrix display unit which indicates the driving status information of the vehicle preferably with a drawing and a character by using the dot matrix.

In accordance with another embodiment of the invention, a tachometer which indicates the engine rotation speed of vehicle, and is preferably, but not limited to a graduated bar shape, and a thermometer/fuel-indicator, which indicates the coolant temperature and the fuel content condition of vehicle, also preferably, but not limited to a graduated bar shape, are formed together in a single panel with the speed meter.

In exemplary embodiments, at the ignition-on (IG ON) of vehicle, the tachometer, the thermometer/fuel-indicator, the segment display unit, and the dot matrix display unit are swept to check an inferiority segment and to display a welcome image in the dot matrix display unit.

In certain examples, the color of the segment display unit and the color of the dot matrix display unit are dualized to be set up.

Preferably, the driving status information of the vehicle includes velocity information, audio information, momentary or current mileage, and indoor temperature information of vehicle.

In another preferred embodiment, the graduation unit indicates the speed in km/h unit, while the united information display window indicates the speed in mile/h unit.

Suitably, the graduation unit indicates a speed which is set in an acceleration setting and a limit speed setting with a bar shape, and the united information display window indicates the set speed with a drawing and a character and indicates the current running speed.

According to preferred embodiments, the display of the tachometer, the thermometer/fuel-indicator, the segment display unit, and the dot matrix display unit are selectively turned on/off.

According to another preferred embodiment of the invention, provided is a digital united information instrument panel for a vehicle including a speedmeter which includes an illumination source formed in both ends of a lower deco plate; a light guide plate delivering a light by the illumination source; and an upper deco plate being irradiated by the light guide plate and including a graduation for indicating a velocity information of vehicle, wherein a segment and a dot matrix are formed in a single panel together and a black mask is formed in the surrounding area of the segment and the dot matrix to concentrate the illumination on the segment and the dot matrix.

In certain preferred embodiments, a tachometer which indicates an engine rotation speed of a vehicle and a thermometer/fuel-indicator which indicates the coolant temperature and the fuel content condition of vehicle are preferably formed together in a single panel with the speedmeter.

In exemplary embodiments, the speedmeter includes a text part which is formed by the segment and the dot matrix in the upper portion of a single panel; and the black mask which is formed in the surrounding area of the text part to remove the scattering of the light of the surrounding area of the text part.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given hereinafter by way of illustration only, and thus are not limitative of the present invention, and wherein.

REFERENCE NUMERALS

| | |
|---|---|
| 100: speedmeter | |
| 140: united information display window | |
| 300: tachometer | 400: fuel-indicator/thermometer |
| 120: graduated bar | 102: glass substrates |
| 104: transparent electrode | 106: liquid crystal |
| 108a, 108b: liquid crystal protection film | |
| 112: black mask | |
| 110a, 110b: segment/dot matrix display unit | |
| 202: whole deco plate | 204: lower portion deco plate |
| 206: light emitting diode | 208: light guide plate |
| 210: upper portion deco plate | 142: segment display unit |
| 144: dot matrix display unit | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF SPECIFIC EMBODIMENTS

As described herein, the present invention includes a digital united information instrument panel for a vehicle including a speedmeter, the speedmeter comprising a graduation unit indicating a velocity information of vehicle and an united information display window indicating a driving status information of vehicle with a number and a character. In certain embodiments, the united information display window forms a segment and a dot matrix together in a single panel and forms a black mask in the surrounding area of the segment and the dot matrix to concentrate an illumination on the segment and the dot matrix. In other embodiments, the united information display window includes a segment display unit which digitally indicates the velocity information of a vehicle by using the segment; and a dot matrix display unit which indicates the driving status information of the vehicle with a drawing and a character by using the dot matrix.

The invention also includes a vehicle that comprises a digital united information instrument panel as described in any of the aspects herein.

Hereinafter, the digital united information instrument panel for vehicle of the invention will be illustrated with reference to exemplary FIGS. 2 to 9e.

Figure 1A:
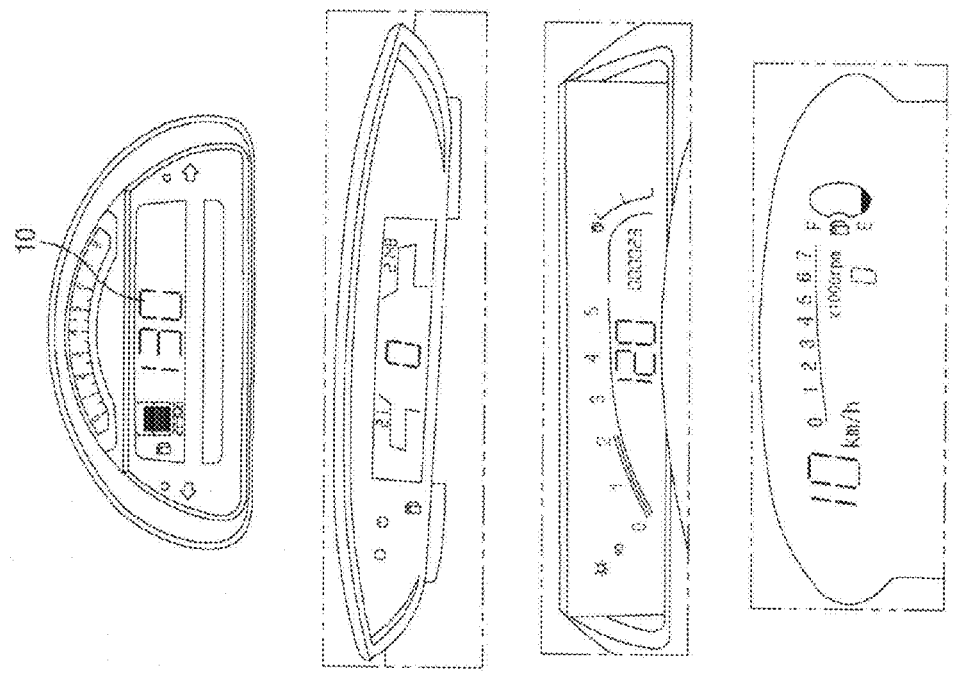
FIG. 1a is an exemplary diagram of the vehicle instrument panel of the related art using only the segment configuration.
Figure 1A:
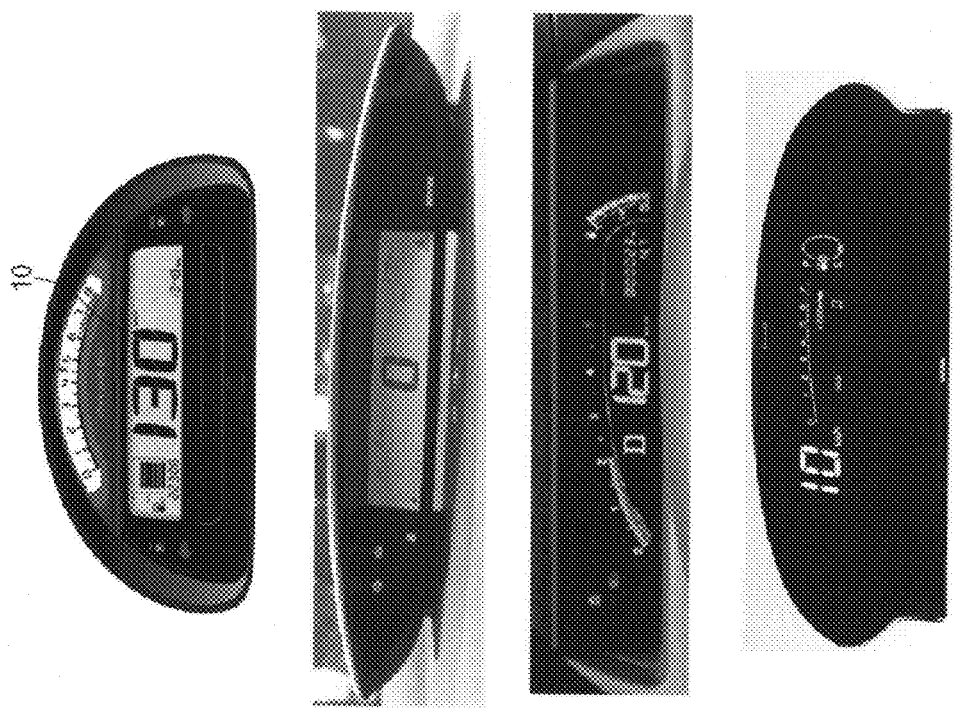
Figure 1B:
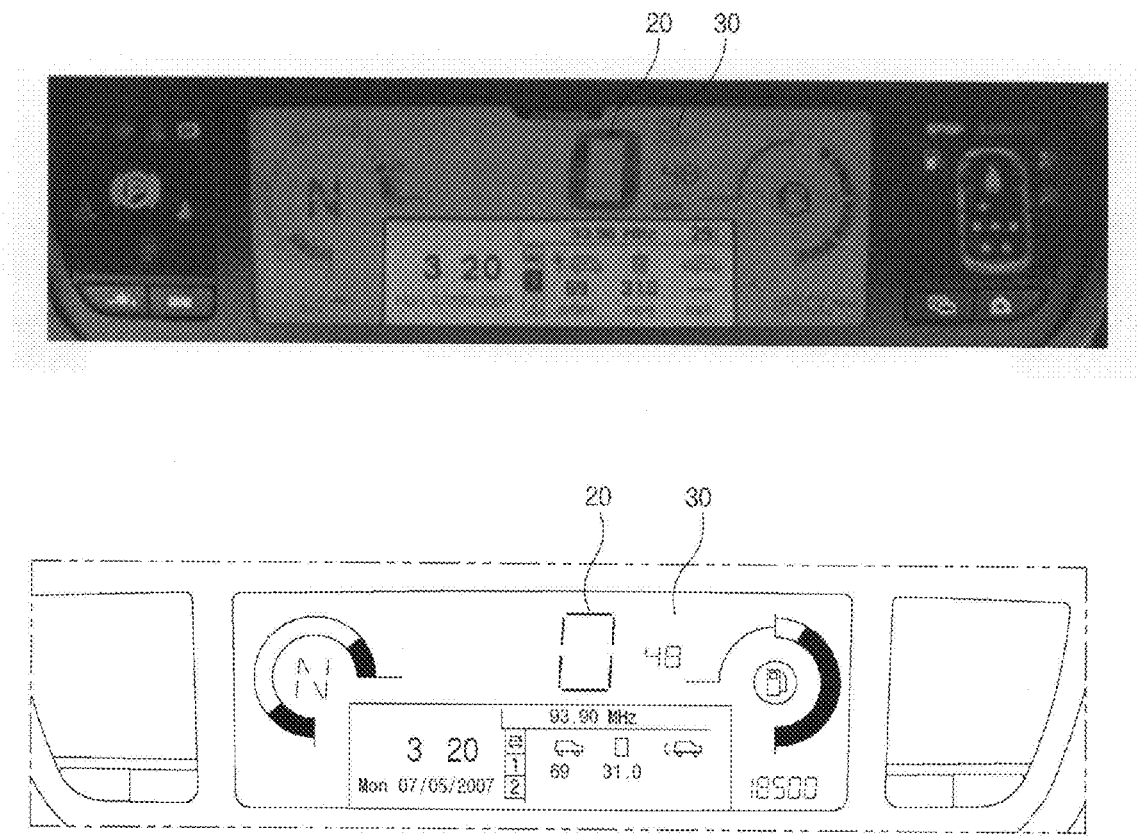
FIG. 1b is an exemplary diagram of the vehicle instrument panel of the positive type configuration of the related art.
Figure 1C:
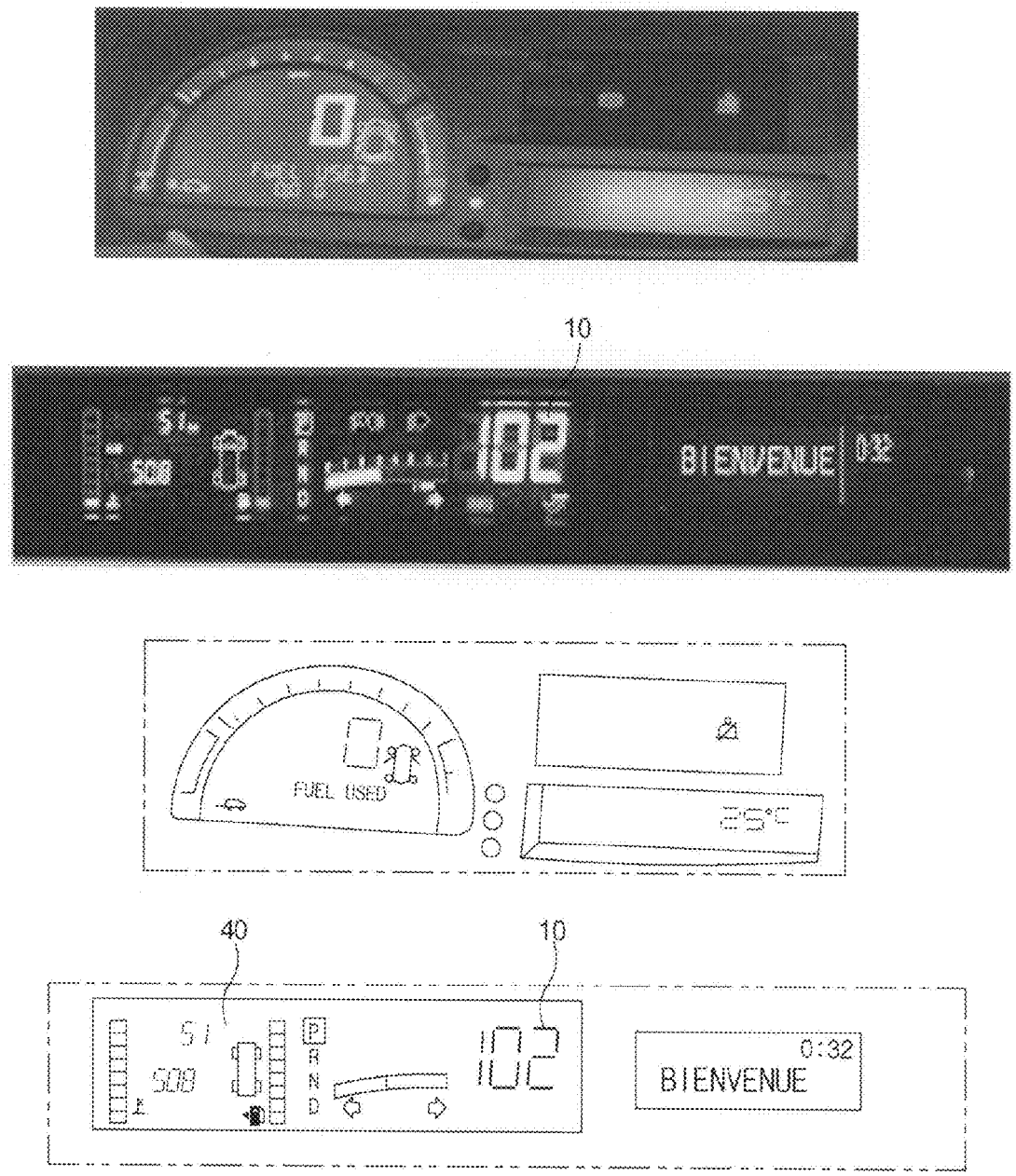
FIG. 1c is an exemplary diagram of the vehicle instrument panel of the negative type with the individual type configuration of the related art.
Figure 2:
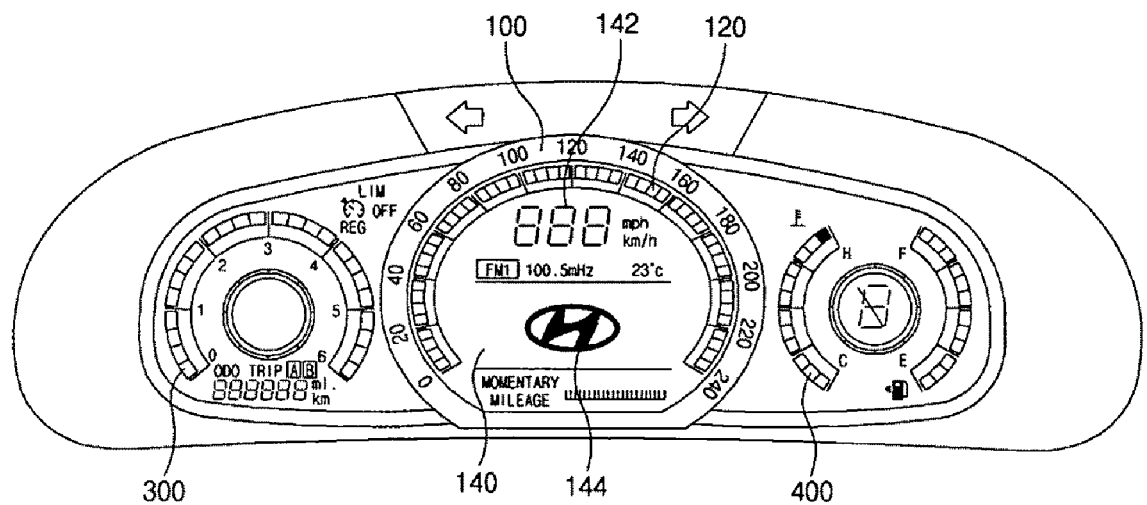
FIG. 2 is a configuration diagram of a digital united information instrument panel for a vehicle of the negative type configuration according to the present invention.

FIG. 2 is an exemplary configuration diagram of the digital united information instrument panel for a vehicle of the negative type according to certain embodiments of the present invention.

According to exemplary embodiments, the digital united information instrument panel for a vehicle of the negative type as set forth in the present invention, the dot matrix and the segment are preferably applied together in one panel with the negative type in which the text part is suitably radiated and the surroundings of the text part are made suitably dark. In addition, by preferably evaporating the black mask in the surroundings of the text part, the contrast ratio is increased to improve the visibility and the readability.

For this, according to preferred embodiments of the instant invention, the digital united information instrument panel for a vehicle of the present invention preferably includes a speedmeter 100, a tachometer 300 and a fuel-indicator/thermometer 400.

In one embodiment, the speedmeter 100 preferably includes a graduated bar 120 and an united information display window 140, while preferably being positioned in the central part of the digital united information instrument panel for vehicle.

The graduated bar 120 preferably indicates the running speed of vehicle with the bar shape.

In exemplary embodiments, the united information display window 140 includes a segment display unit 142 which indicates a number and a character by applying the segment and a dot matrix display unit 144 which indicates a drawing, a character, and a number by suitably applying the dot matrix. Preferably, the segment display unit 142 digitally indicates the running speed of vehicle. In other exemplary embodiments, the dot matrix display unit 144 indicates the united information including the audio information, for example, but not limited to, the radio channel, and the momentary or current mileage.

As shown in exemplary FIG. 2, the segment display unit 142 indicates the speed in km/h units, but can also indicate the speed in the mile/h units, such that in certain exemplary embodiments, the segment display unit 142 can indicate the speed of the mile/h unit and the graduated bar 120 can indicate the speed of the km/h unit, suitably as the dual type.

In further embodiments, the speedmeter 100 indicates the limit speed and the speed which is set in the setting of running speed with the bar shape and indicates the current running speed through the segment display unit 142. In other embodiments, the speedmeter 100 can selectively turn the graduated bar 120 on and off and the united information display window 140 on and off to indicate the vehicle speed by the graduated bar 120 only or by the segment display unit 142 only.

In preferred embodiments, the tachometer 300 is equipped on the left side of the speedmeter 100 and indicates the number of rotations of engine, that is, the RPM (revolutions per minute).

In other preferred embodiments, the fuel-indicator/thermometer 400 indicates the coolant temperature on the left side and indicates the fuel status on the right side.

The exemplary configurations as set forth above are suitably applied to one panel. Preferably, by applying the negative method, the illumination is irradiated into the text part of the segment display unit 142 and the dot matrix display unit 144 while the surroundings of the text part is made dark.

Figure 3:
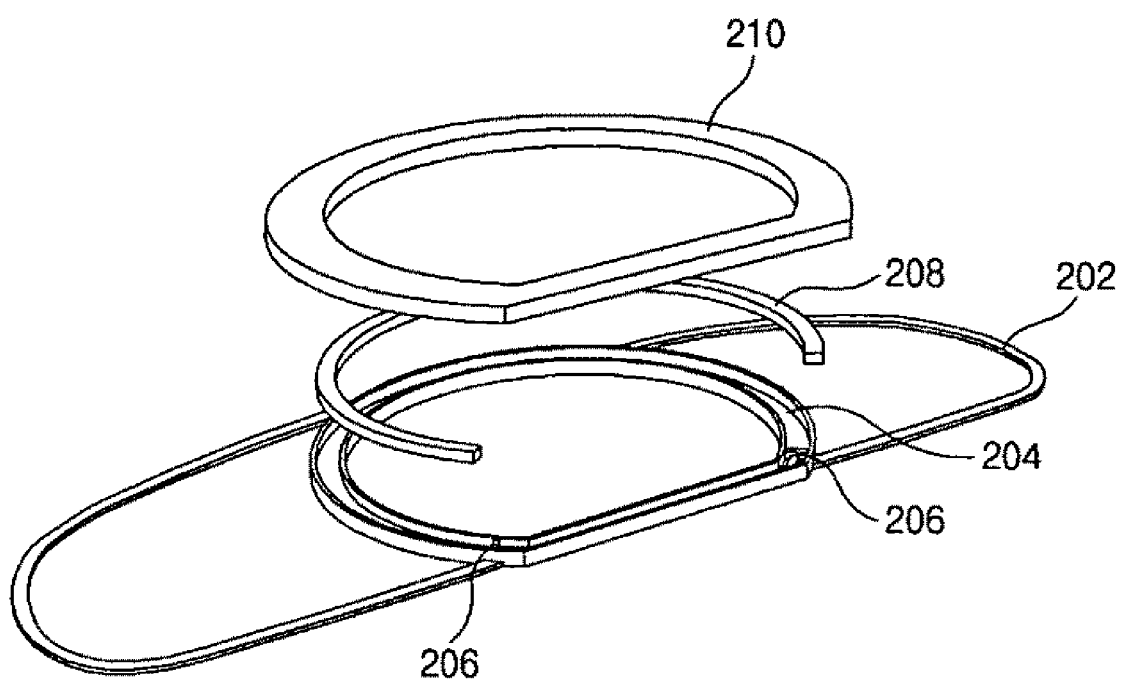
FIG. 3 is an internal configuration diagram of the digital united information instrument panel for a vehicle as illustrated in FIG. 2.

In another embodiment, FIG. 3 is an exemplary schematic internal configuration diagram of the digital united information instrument panel for a vehicle as shown in FIG. 2.

The digital united information instrument panel for a vehicle preferably includes, but is not limited only to, a whole deco plate 202 which forms the whole outer shape, a lower portion deco plate 204 which is suitably formed in a fan-shape of a given angle at the upper portion of the whole deco plate 202, an illumination source 206 which is preferably installed at both ends of the lower portion deco plate 204 to irradiate a light into the digital united information instrument panel for vehicle, a light guide plate 208 which is suitably formed in the upper portion of the lower portion deco plate 204 in order to deliver the light to the upper portion deco plate 210, an upper portion deco plate 210 which is suitably formed in the upper portion of the light guide plate 208 to indicate a graduation.

At this time, suitable illumination sources 206 include, but are not only limited to, a LED (light emit diode), and the light guide plate 208 preferably includes a prism to reflect the light radiated by the illumination source 206 to deliver to the upper portion deco plate 210.

In FIG. 3, an exemplary internal configuration of the speedmeter positioned in the central part of the digital united information instrument panel for a vehicle is schematically shown, but the tachometer and the thermometer/fuel-indicator also have a suitable internal configuration similar to FIG. 3

Figure 4:
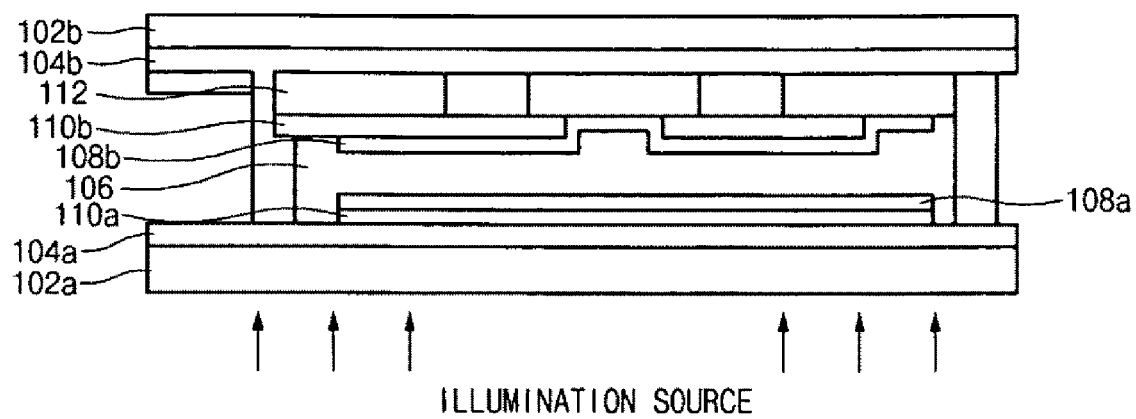
FIG. 4 is a cross-sectional view of the digital united information instrument panel for vehicle as illustrated in FIG. 2.

FIG. 4 is an exemplary cross-sectional view of the digital united information instrument panel for a vehicle according to the present invention.

As to the digital united information instrument panel for vehicle of the negative type according to the present invention, preferably a transparent electrode 104a is laminated on the upper portion of a glass substrate 102a and a segment/dot matrix display unit 110a is laminated on the upper portion of the transparent electrode 104a. A liquid crystal 106 preferably surrounded by liquid crystal protection films 108a, 108b is formed on the upper portion of the segment/dot matrix display unit 110a. A segment/dot matrix display unit 110b is preferably laminated on the upper portion of the liquid crystal protection film 108b. A plurality of black masks 112 are separated to be formed on the upper portion of the segment/dot matrix display unit 110b. Thereafter, the transparent electrode 104b and glass substrates 102b are preferably sequentially laminated.

In preferred embodiments, the black mask 112 is designed to display the region excluding the segment/dot matrix display unit 110a, 110b to be dark, and the black mask 112 is deposited in the region excluding the segment/dot matrix display unit 110b which becomes the text part. In preferred embodiments, the black mask 112 is preferably deposited to be partly overlapped with the segment/dot matrix display unit 110b according to the error range of the segment/dot matrix display unit 110b.

Accordingly, in preferred embodiments, the present invention deposits the black mask 112, thereby, suitably reducing the transmittance ratio in the segment OFF-state. Accordingly, the contrast ratio increases by using the below Equation 1. According to Equation 1, the contrast ratio is a brightness ratio of the on-segment and the off segment. Therefore, if the light transmittance of the off segment is reduced, the contrast ratio increases.

$$\text{contrast-ratio} = \frac{\text{on-segment-transmittance}}{\text{off-segment-transmittance}} \qquad \text{[Equation 1]}$$

Figure 5:
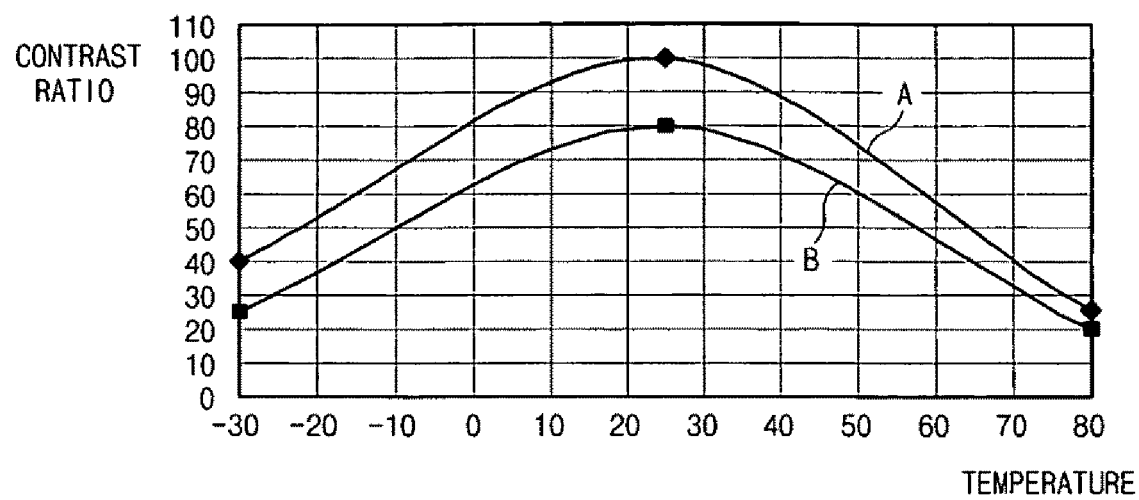
FIG. 5 is a graph which compares the contrast ratio according to the temperature of the digital united information instrument panel for the vehicle of FIG. 4 with the related art.

Preferably, the on-segment transmittance refers to the transmittance ratio when the segment is in the on status, and the off-segment transmittance refers to the transmittance ratio when the segment is in the off status. In embodiments of the present invention, by lowering the transmittance ratio of the segment of the OFF-state by using the black mask 112, there is little light leakage, and accordingly the off segment transmittance ratio decreases. Therefore, as shown in FIG. 5, the contrast ratio increases in exemplary case A of using the black mask 112 than in exemplary case B of not using the black mask 112.

Accordingly, by using the black mask 112, the present invention suitably removes the scattering of the light of the surroundings in advance except in the region in which a character is to be displayed, so that the light is preferably converged into the text part in which a character is to be displayed, that is, preferably into the segment/dot matrix display unit 110*b*, and thus according to such preferred embodiments, the visibility and the readability become higher.

Figure 6:
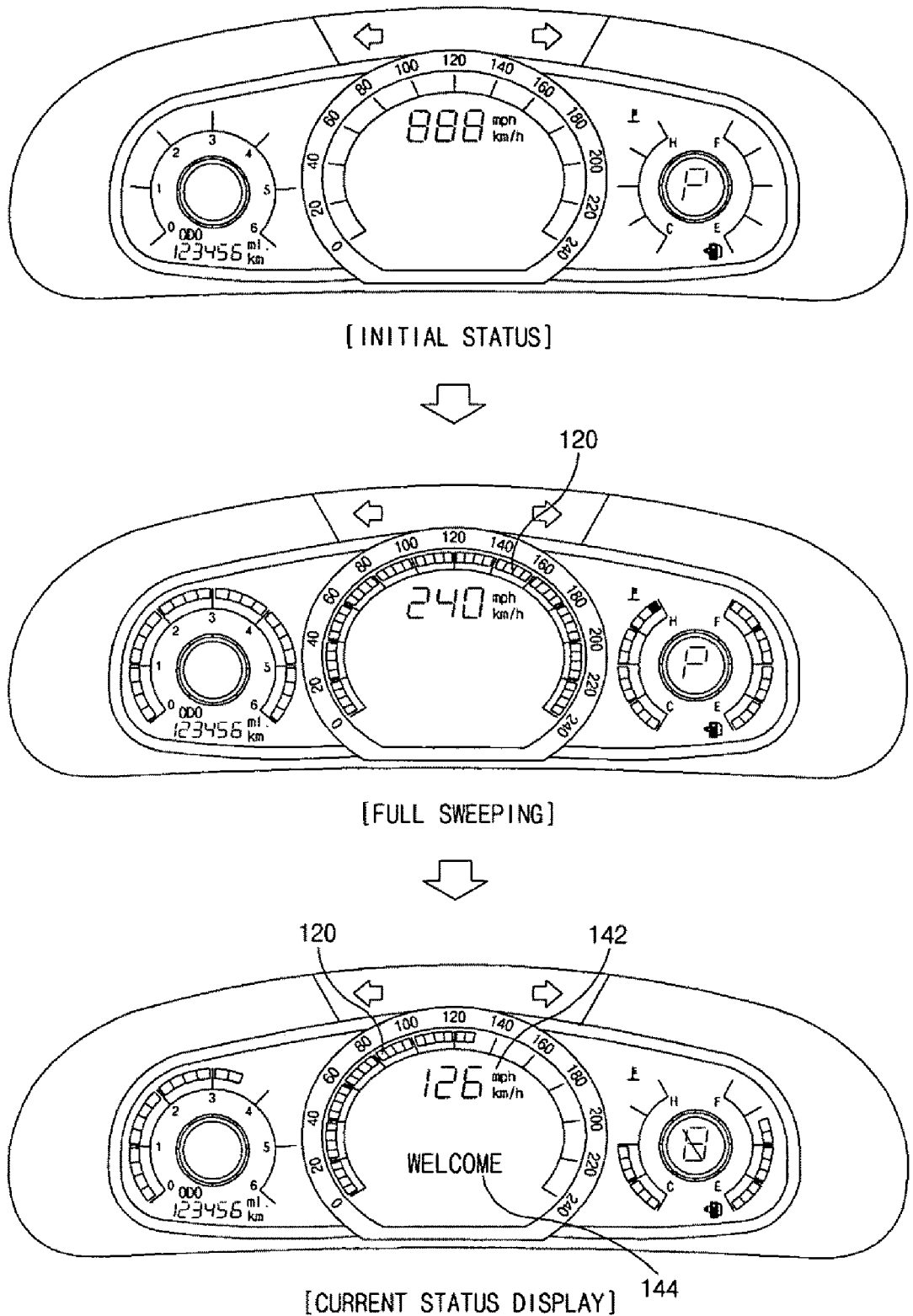
FIG. 6 is an exemplary diagram implementing the welcome image and sound of the digital united information instrument panel for the vehicle of FIG. 2.

FIG. 6 is an exemplary diagram implementing the welcome image and the sound of the digital united information instrument panel for a vehicle according to the present invention.

In exemplary embodiments, while sweeping the segment display unit 142 which preferably indicates a number and a character by using the segment of the united information display window 140, and the dot matrix display unit 144 which preferably indicates a drawing, a number and a character by using the dot matrix at the ignition on (IG ON), the digital united information instrument panel for a vehicle of the present invention checks the inferiority segment and suitably displays the current status, thus displaying a welcome image in the dot matrix display unit 144. In certain embodiments, it is preferable that the sound is simultaneously applied to be implemented.

FIGS. 7*a* to 7*d* are exemplary diagrams dualizing the color of the segment display unit 142 and the dot matrix display unit 144 of the digital united information instrument panel for vehicle according to the present invention.

In certain examples, the dot matrix display unit 144 of the digital united information instrument panel for vehicle according to the present invention applies up to three color LED and, as shown in FIGS. 7*a* to 7*d*, suitably dualizes the color of the segment display unit 142 and the dot matrix display unit 144 to reduce the color variation due to the difference of physical characteristics between the dot matrix and the segment.

Figure 7A:
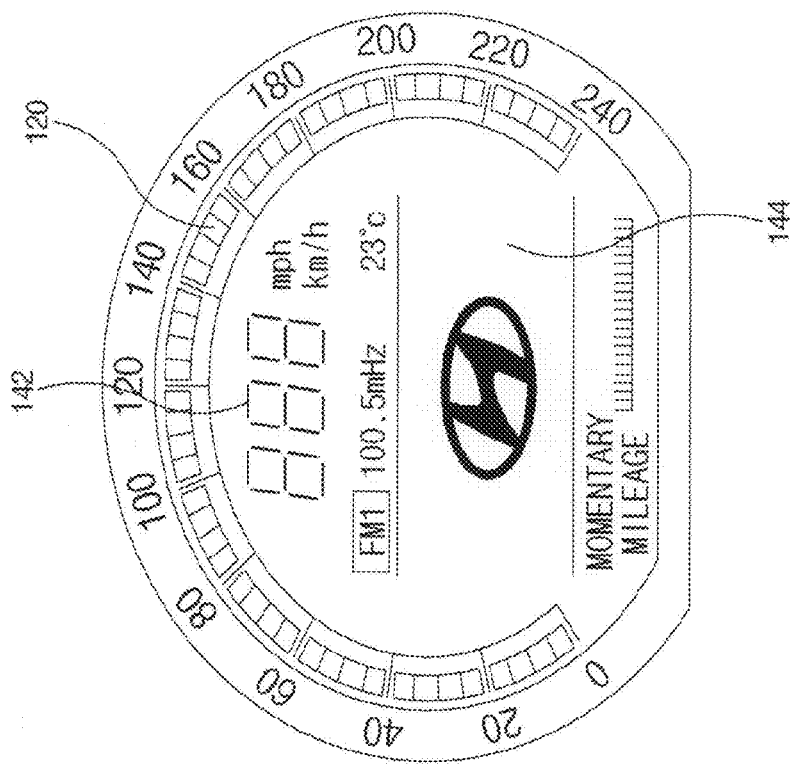
FIGS. 7a to 7d are exemplary diagrams dualizing the color of the dot matrix unit and the segment of the digital united information instrument panel for the vehicle of FIG. 2.
Figure 7A:
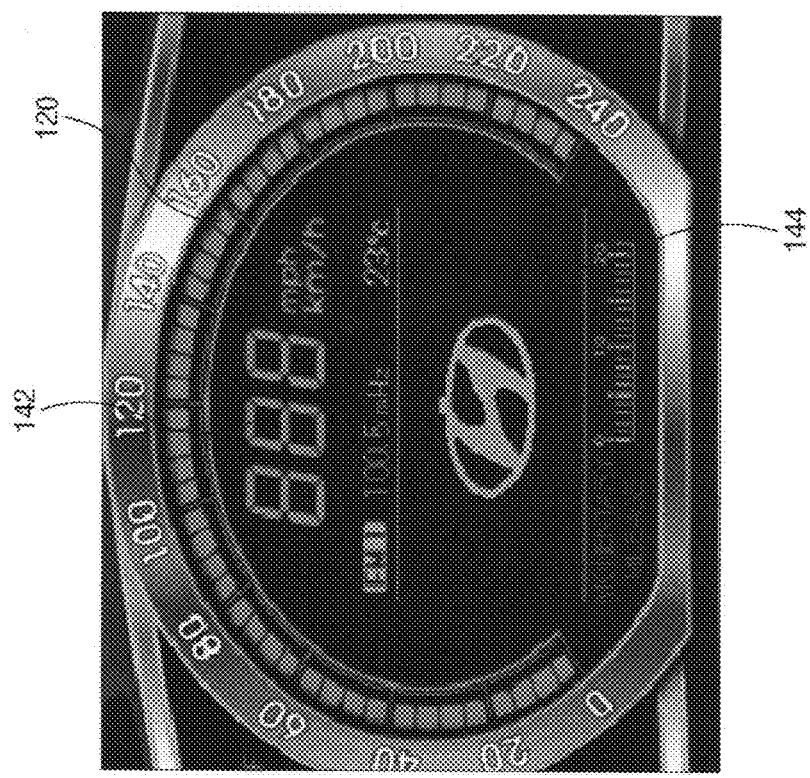
Figure 7B:
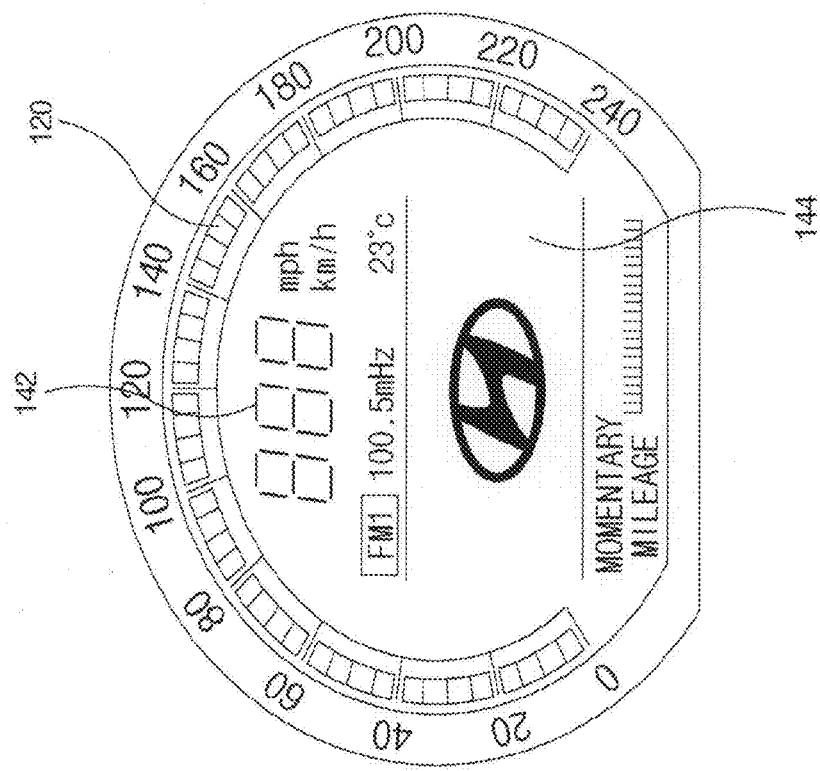
Figure 7B:
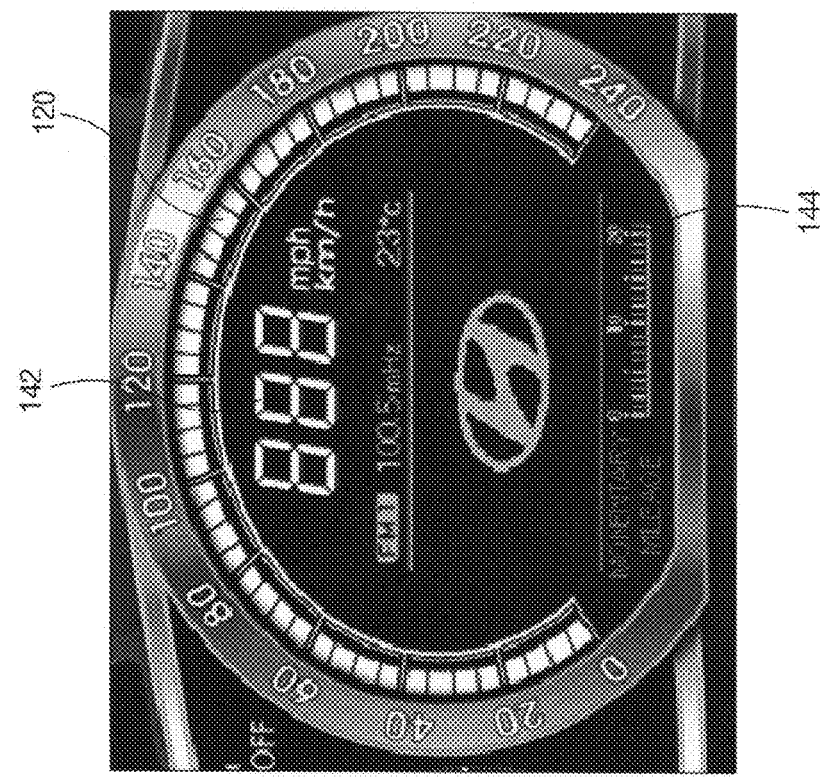
Figure 7C:
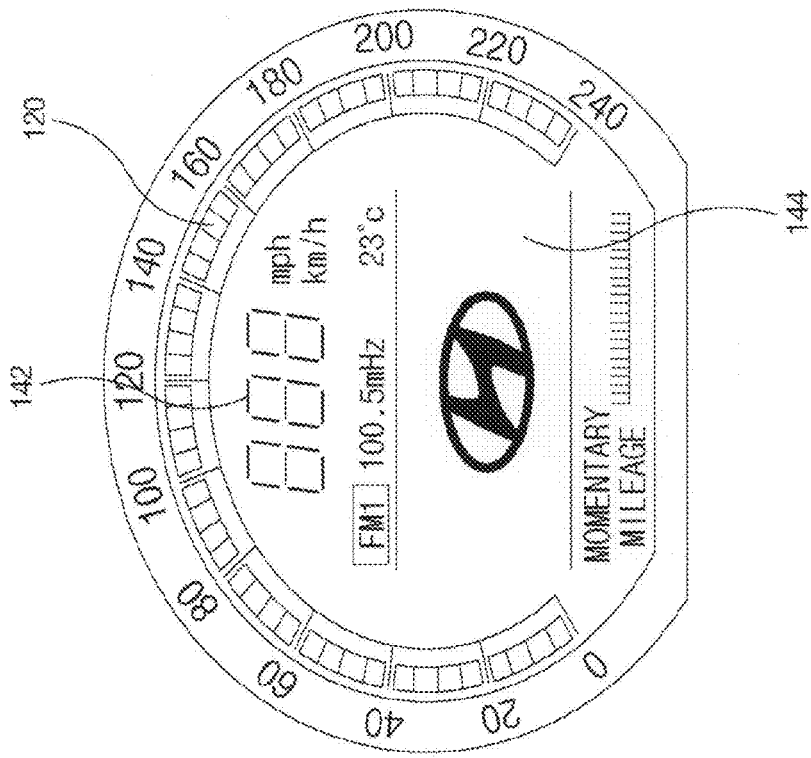
Figure 7C:
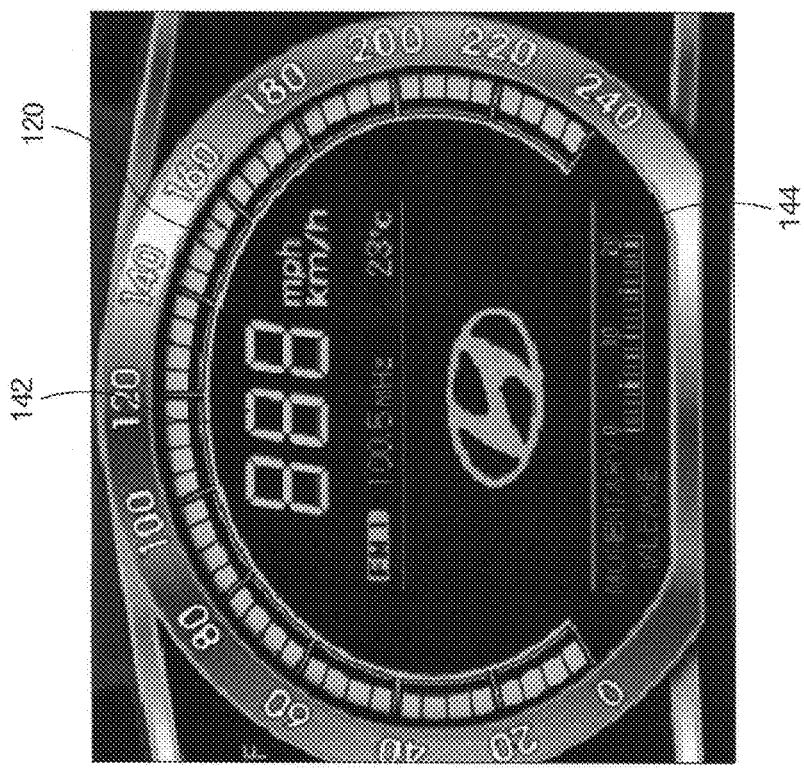
Figure 7D:
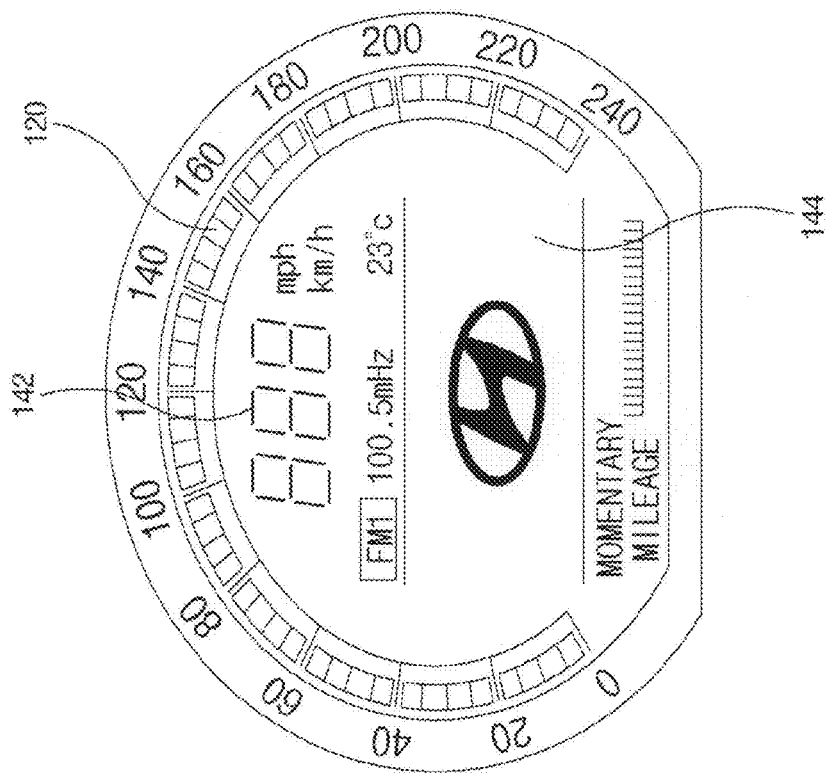
Figure 7D:
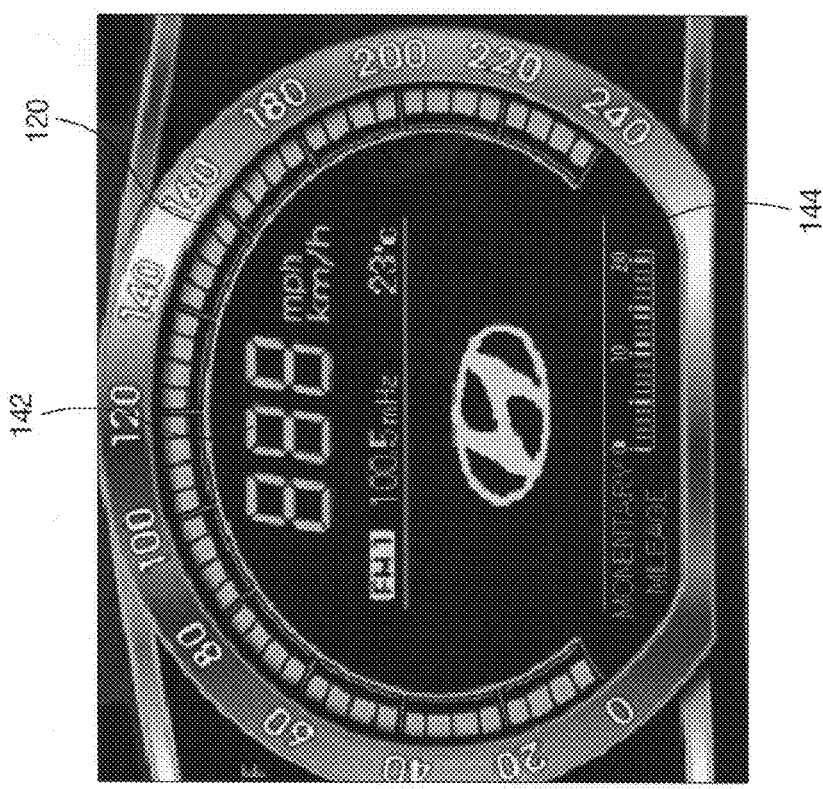

FIG. 7*a* shows an example in which the red color is suitably applied to the graduated bar 120 and the segment display unit 142 while the orange color is preferably applied to the dot matrix display unit 144. FIG. 7*b* shows an example in which the white color is preferably applied to the graduated bar 120 and the segment display unit 142 while the cyan color is preferably applied to the dot matrix display unit 144. FIG. 7*c* shows an example in which the green color is suitably applied to the graduated bar 120 and the segment display unit 142 while the yellow green color is preferably applied to the dot matrix display unit 144. FIG. 7*d* shows an example in which the orange color is preferably applied to the graduated bar 120 and the segment display unit 142 while the yellow color is preferably applied to the dot matrix display unit 144.

Figure 8A:
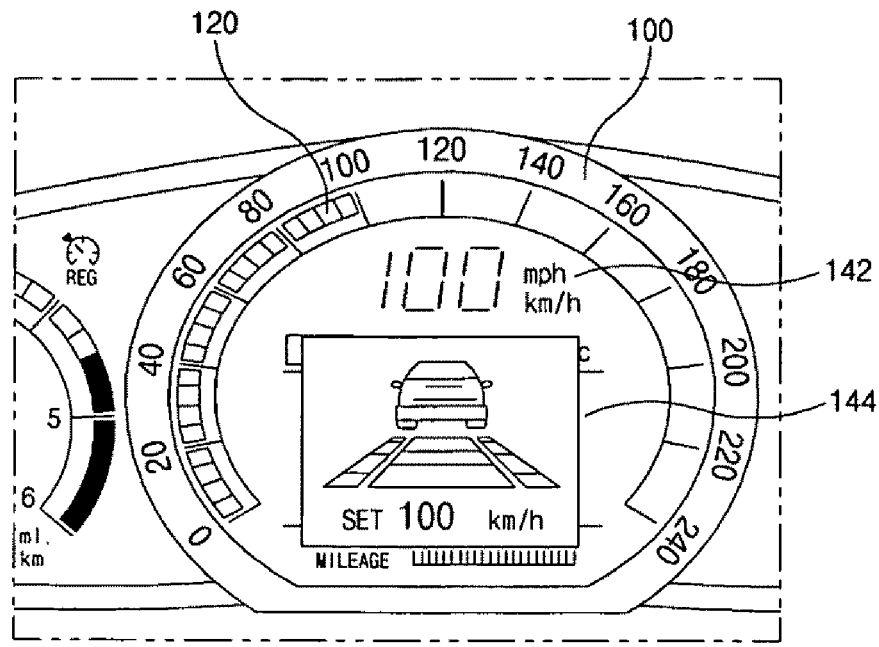
FIG. 8a is an exemplary diagram indicating the acceleration setting with the bar type in the digital united information instrument panel for the vehicle of FIG. 2.
Figure 8B:
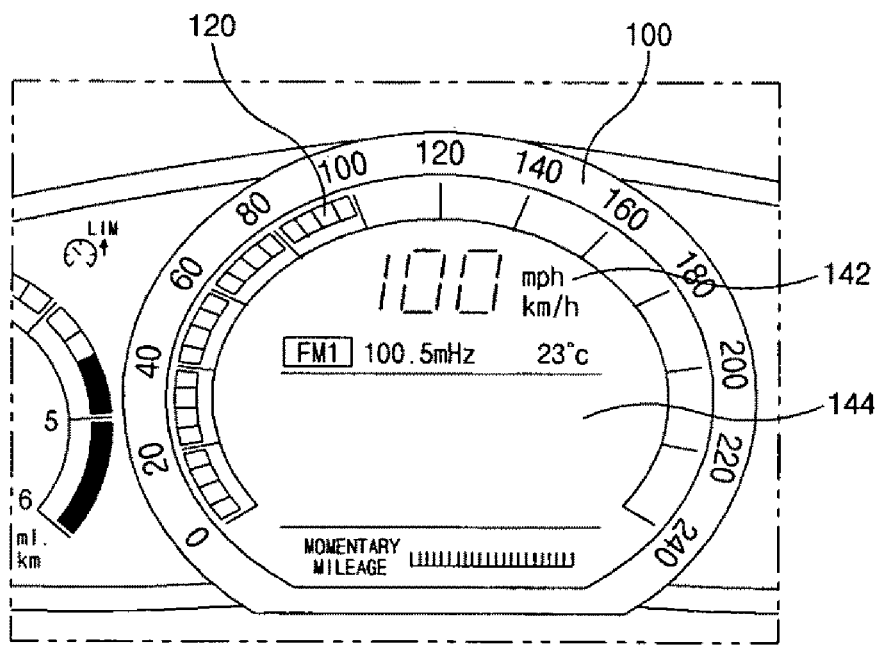
FIG. 8b is an exemplary diagram indicating the limit speed setting of the digital united information instrument panel for the vehicle of FIG. 2 with the bar type.

Preferably, as shown in FIG. 8*a* and FIG. 8*b*, the digital united information instrument panel for vehicle of the present invention indicates a setting speed by the acceleration setting function and a setting speed by the limit speed setting function with the bar shape, so that a driver can recognize the running speed status.

In preferred examples, the acceleration setting function is a function which automatically sets up the running speed. FIG. 8*a* shows an example of indicating the speed of the exemplary speed 100 km/h which is set up by the graduated bar 120 of the speedmeter 100 and indicating the running speed in the segment display unit 142, in case the running speed is set up as 100 km/h.

In further embodiments, the limit speed setting function is preferably set up in order to limit the maximum acceleration speed of the running speed. FIG. 8*b* shows an example where the limit speed is indicated by the graduated bar 120 of the speedmeter 100, while the running speed is indicated in the segment display unit 142, in case of setting up the limit speed as 100 km/h.

FIGS. 9*a* to 9*e* are exemplary diagrams of the interface of the digital united information instrument panel for vehicle according to the present invention.

As shown in FIGS. 9*a* to 9*e*, in preferred embodiments, the digital united information instrument panel for a vehicle of the present invention can selectively implement the interface by function.

Figure 9A:
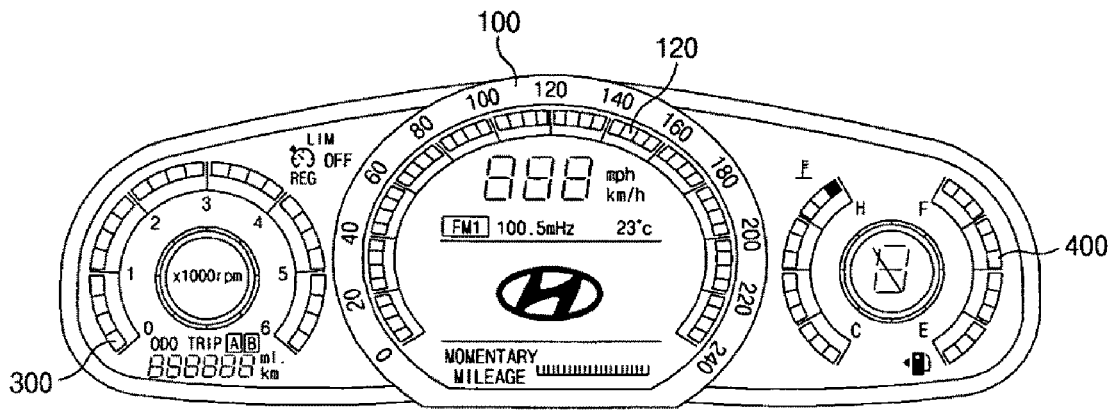
FIGS. 9a to 9e are exemplary diagrams of the interface of the digital united information instrument panel for vehicle of FIG. 2.
Figure 9B:
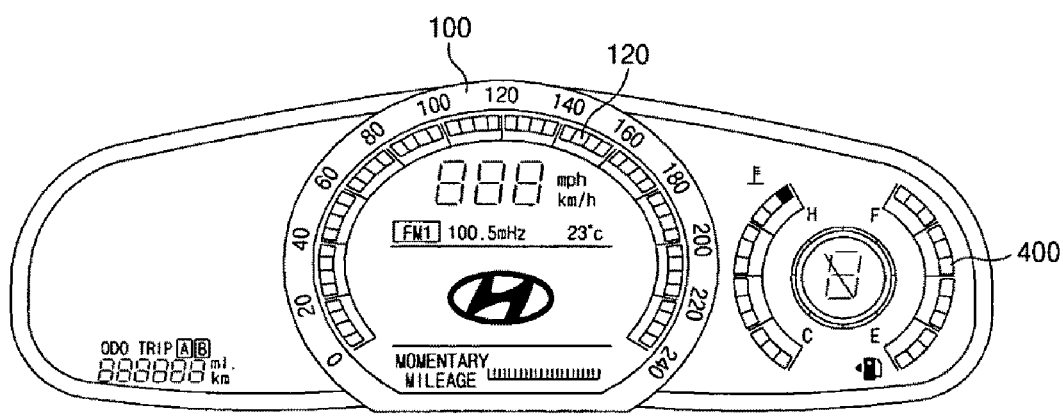
Figure 9C:
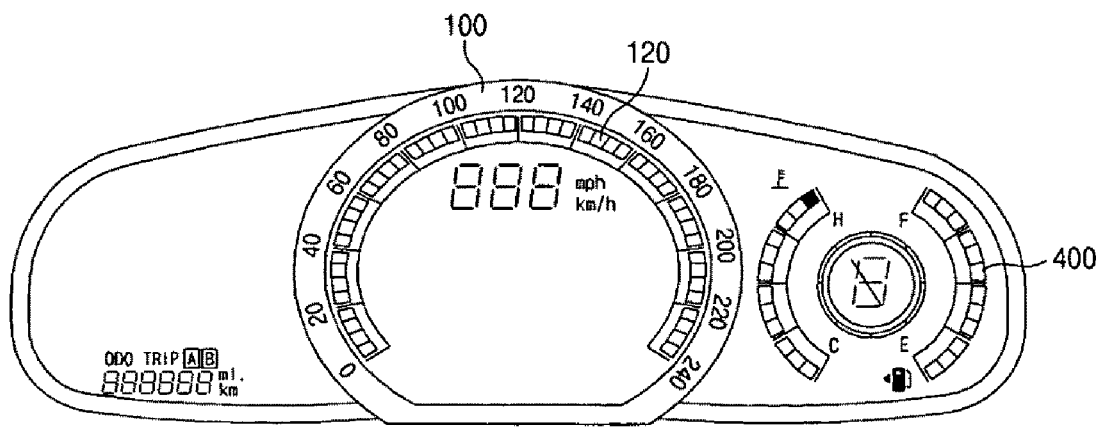
Figure 9D:
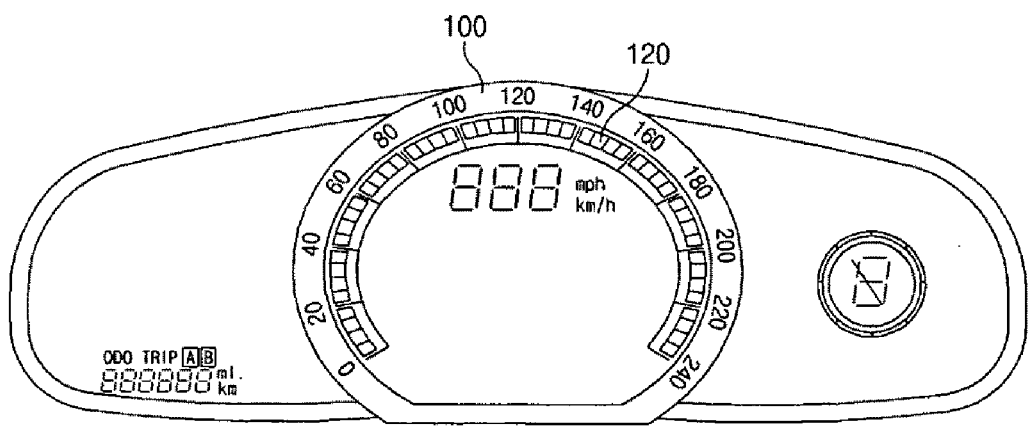
Figure 9E:
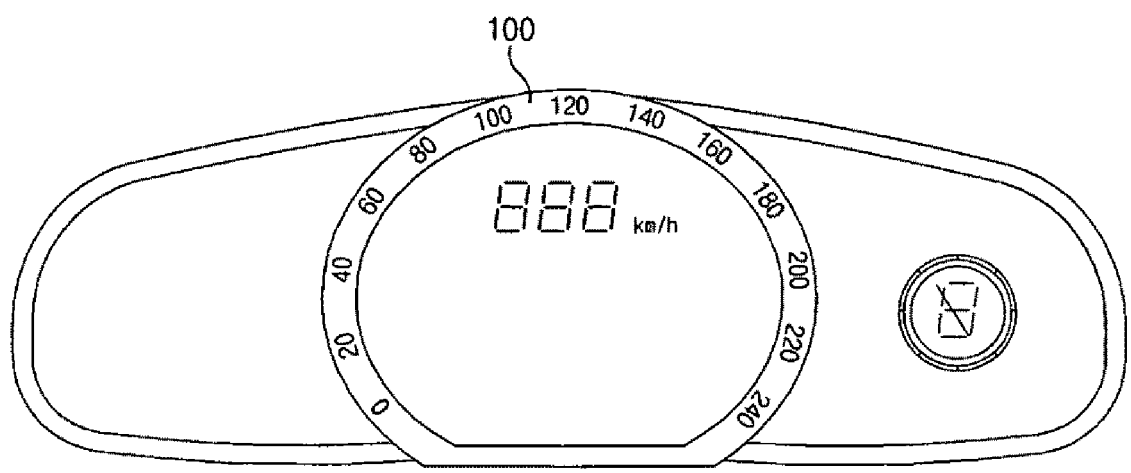

FIG. 9*a* is an exemplary diagram of indicating the whole panel including the speedmeter 100, the tachometer 300, and the thermometer/fuel-indicator 400. FIG. 9*b* is an example of preferably switching off of the display of the tachometer 300 in the whole display status of FIG. 9*a*. FIG. 9*c* is an example of preferably switching off of the display of not only the tachometer 300 but also the segment display unit 142 in FIG. 9*b*. FIG. 9*d* is an example of switching off of the display of the tachometer 300, the segment display unit 142, and the thermometer/fuel-indicator 400. FIG. 9*e* is an example of switching off of all configurations.

In other preferred embodiments, it is preferable that the interface of FIGS. 9*a* to 9*e* is sequentially provided according to the switch push frequency.

As described above, an effect of the present invention is that the visibility and the readability of the vehicle instrument panel are improved to increase the convenience of driver.

What is claimed is:

1. A digital united information instrument panel for a vehicle including a speedmeter, the speedmeter comprising:
    a graduation unit indicating a velocity information of vehicle; and an united information display window indicating a driving status information of vehicle with a number and a character,
    wherein the united information display window forms a segment and a dot matrix together in a single panel and forms a black mask in the surrounding area of the segment and the dot matrix to concentrate an illumination on the segment and the dot matrix,
    wherein the united information display window includes:
        a segment display unit which digitally indicates the velocity information of a vehicle by using the segment; and
        a dot matrix display unit which indicates the driving status information of the vehicle with a drawing and a character by using the dot matrix
    wherein a tachometer which indicates an engine rotation speed of the vehicle in a graduated bar shape and a thermometer/fuel-indicator which indicates the coolant temperature and the fuel content condition of vehicle in the graduated bar shape are formed together in a single panel with the speedmeter
    wherein, at the ignition-on (IG ON) of the vehicle, the tachometer, the thermometer/fuel-indicator, the segment display unit, and the dot matrix display unit are swept to check an inferiority segment and to display a welcome image in the dot matrix display unit.

2. The digital united information instrument panel for the vehicle of claim 1, wherein the color of the segment display unit and the color of the dot matrix display unit are dualized to be set up.

3. The digital united information instrument panel for the vehicle of claim 1, wherein the driving status information of the vehicle includes a velocity information, an audio information, a momentary mileage, and an indoor temperature information of vehicle.

4. The digital united information instrument panel for the vehicle of claim 1, wherein the graduation unit indicates the speed of km/h unit while the united information display window indicates the speed of mile/h unit.

5. The digital united information instrument panel for the vehicle of claim 1, wherein the graduation unit indicates a speed which is set in an acceleration setting and a limit speed setting with a bar shape, and the united information display window indicates the set speed with a drawing and a character and indicates the current running speed.

6. The digital united information instrument panel for the vehicle of claim 1, wherein the display of the tachometer, the thermometer/fuel-indicator, the segment display unit, and the dot matrix display unit are selectively turned on/off.

7. The digital united information instrument panel for the vehicle of claim 1, wherein the speedmeter includes:
    a text part which is formed by the segment and the dot matrix in the upper portion of a single panel; and
    the black mask which is formed in the surrounding area of the text part to remove the scattering of the light of the surrounding area of the text part.

8. A vehicle comprising the digital united information instrument panel of claim 1.

9. A digital united information instrument panel for a vehicle including a speedmeter, the speedmeter comprising:
    an illumination source formed in both ends of a lower deco plate;
    a light guide plate delivering a light by the illumination source; and
    an upper deco plate being irradiated by the light guide plate and including a graduation for indicating a velocity information of vehicle, wherein a segment and a dot matrix are formed together in a single panel and a black mask is formed in the surrounding area of the segment and the dot matrix to concentrate the illumination on the segment and the dot matrix.

10. The digital united information instrument panel for the vehicle of claim 9, wherein a tachometer which indicates an engine rotation speed of vehicle and a thermometer/fuel-indicator which indicates the coolant temperature and the fuel content condition of vehicle are formed together in a single panel with the speedmeter.

11. The digital united information instrument panel for the vehicle of claim 9, wherein the speedmeter includes:
    a text part which is formed by the segment and the dot matrix in the upper portion of a single panel; and
    the black mask which is formed in the surrounding area of the text part to remove the scattering of the light of the surrounding area of the text part.

\* \* \* \* \*